United States Patent [19]

Brown et al.

[11] 4,078,627

[45] Mar. 14, 1978

[54] WHEELCHAIR CONTROLS

[75] Inventors: Robert Edward Brown, Redditch; Raymond Hatfield, Blackheath, both of England

[73] Assignee: Biddle Engineering Co., Ltd., England

[21] Appl. No.: 685,479

[22] Filed: May 11, 1976

[30] Foreign Application Priority Data

May 13, 1975 United Kingdom ............... 20052/75
Jan. 9, 1976 United Kingdom ................... 734/76

[51] Int. Cl.[2] ............................................. B62D 11/04
[52] U.S. Cl. ................................. 180/6.5; 74/471 R; 180/DIG. 3
[58] Field of Search ................. 180/77 H, 77 HT, 6.5, 180/DIG. 3; 3/1.1; 74/471 XY, 471 R

[56] References Cited

U.S. PATENT DOCUMENTS

| | | | |
|---|---|---|---|
| 2,902,696 | 9/1959 | Mittel et al. | 3/1.1 |
| 3,037,570 | 6/1962 | Olson | 180/6.5 |
| 3,374,845 | 3/1968 | Selwyn | 180/98 X |
| 3,891,042 | 6/1965 | Braun | 180/77 H |

FOREIGN PATENT DOCUMENTS

| | | | |
|---|---|---|---|
| 1,245,922 | 9/1971 | United Kingdom | 180/DIG. 3 |

*Primary Examiner*—Joseph F. Peters, Jr.
*Assistant Examiner*—John A. Pekar
*Attorney, Agent, or Firm*—Dowell & Dowell

[57] ABSTRACT

A control unit for a motorized wheelchair for an invalid the control unit having a part engageable with the occupants chin and being movable in a first direction in order to cause movement of the wheelchair in a forwards direction and in a second and third direction to steer the wheelchair either to the left or to the right, an on/off and reverse/forward switch being provided operable by the occupants head.

5 Claims, 5 Drawing Figures

WHEELCHAIR CONTROLS

BACKGROUND OF THE INVENTION

1. Field of the Invention

This invention relates to a motorised wheelchair for use by an invalid and in particular relates to an improved control means whereby the wheelchair can be simply maneouvred by the occupant.

2. Description of the Prior Art

Motorised wheelchairs for use by invalids are well known and in the past controls have been provided whereby the occupant operates a joy stick control through which the wheelchair may be controlled to move either in a forwards or backwards direction in addition to providing a differential whereby the wheelchair may be steered either to the left or the right.

Such controls have proved satisfactory in the case where the occupant of the wheelchair has the use of his hands. However, if the occupant does not have the use of his hands the problem arises as to how a motorised wheelchair may be controlled by the occupant.

BRIEF SUMMARY OF THE INVENTION

It is an object of the present invention to provide control means whereby an invalid who does not have the use of this hands may operate a motorised wheelchair.

According to the present invention we provide a control unit on or for a motorised wheelchair having at least two motors each of the two motors driving a wheel on one side of the wheelchair, said control unit comprising a chin engageable part capable of movement from an "at rest" position in a first direction, movement in said first direction causing power to be supplied to the motors in a variable and increasing quantity on increasing displacement from said "at rest" position; and in a second direction from said "at rest" position, movement in said second direction operable to cause more power to be supplied to one motor than the other; and in a third direction from said "at rest" position, movement in said third direction operable to cause more power to be supplied to said other motor than said one motor.

Preferably the power differential supplied to the motors increases on increased displacement of said chin engageable part from said "at rest" position and in said second and third directions.

By the term "chin engageable part" it is intended to include a part that can not only be engaged by the chin but such part may alternatively be engaged by an arm or leg or a neck of a person or any other suitable part of the body of which the occupant of the wheelchair has the use.

Preferably said chin engageable part is resiliently biased to its "at rest" position and is movable in a downwards direction to cause power to be supplied to the motors and additionally is pivotally mounted about a horizontal axis running in a fore and aft direction relative to the wheelchair in an "upright" position and pivotal movement of the chin engageable part about said axis to the left will cause the wheelchair to turn to the left, and pivotal movement to the right from said "upright" position causes the wheelchair to turn to the right.

The control unit may include a pair of centre spindle variable resistors each of the spindles being capable of rotation on movement of the chin engageable part.

A switch may be provided whereby the control unit may be rendered operative or inoperative and a further switch may be provided having a position in which operation of the chin engageable part of the control unit in said first direction will cause the wheelchair to move in a forwards direction and another position in which operation of the chin engageable part of the control unit in said first direction will cause the wheelchair to move in the reverse direction.

As an alternative to said further switch the chin engageable part may be capable of movement in a forward direction causing power to be supplied to the motor such that the wheelchair may be driven in reverse.

BRIEF DESCRIPTION OF THE DRAWINGS

The present invention will now be described in more detail by way of example only with reference to the accompanying drawings wherein.

DESCRIPTION OF THE PREFERRED EMBODIMENTS

Figure 1:
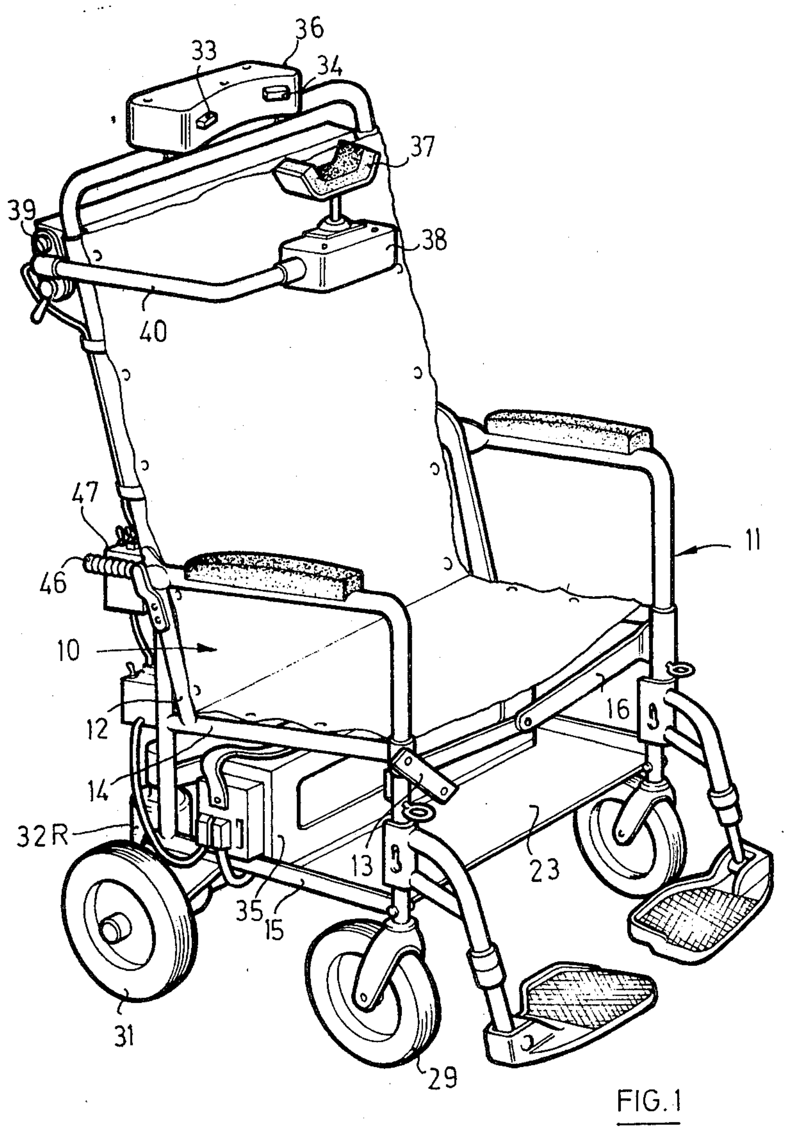
FIG. 1 is an illustration of a wheelchair provided with a control unit of the present invention.

Referring first to FIG. 1 the wheelchair includes a frame construction which includes a pair of side members 10, 11 each side member 10, 11 including a back upright member 12 of tubular constuction, a front upright member 13 also of tubular construction, a pair of tubular members 14 and 15 interconnecting the front and back members 13 and 12. Three linkages, only one of which is completely shown at 16, interconnect the side frame members 10 and 11. Each linkage includes a pair of pivotally connected links which can be moved to an overcentre position in which they serve to maintain the side frame members 10 and 11 spaced apart as shown in FIG. 1.

The wheels of the wheelchair comprise a pair of castor wheels 29 secured in the lower ends of the tubular members 15, and a pair of driving wheels 31 are mounted at the rear of the wheelchair. The wheels can either have pneumatic tyres or solid rubber tyres and conveniently have an external diameter of about 8 inches. Each of the driving wheels 31 are driven by an electric motor 32. The output shafts of the electric motor not only provide the drive to the wheels 31 but also are the sole support therefor, thus eliminating the need for any further means for mounting the wheels 31.

The power for driving the motors is obtained from batteries contained within a battery casing 35 supported by a shelf 23 formed by a sheet of flexible material.

The battery casing 35 may alternatively be clipped on to the member 15 or be supported in any other convenient way.

Figure 2:
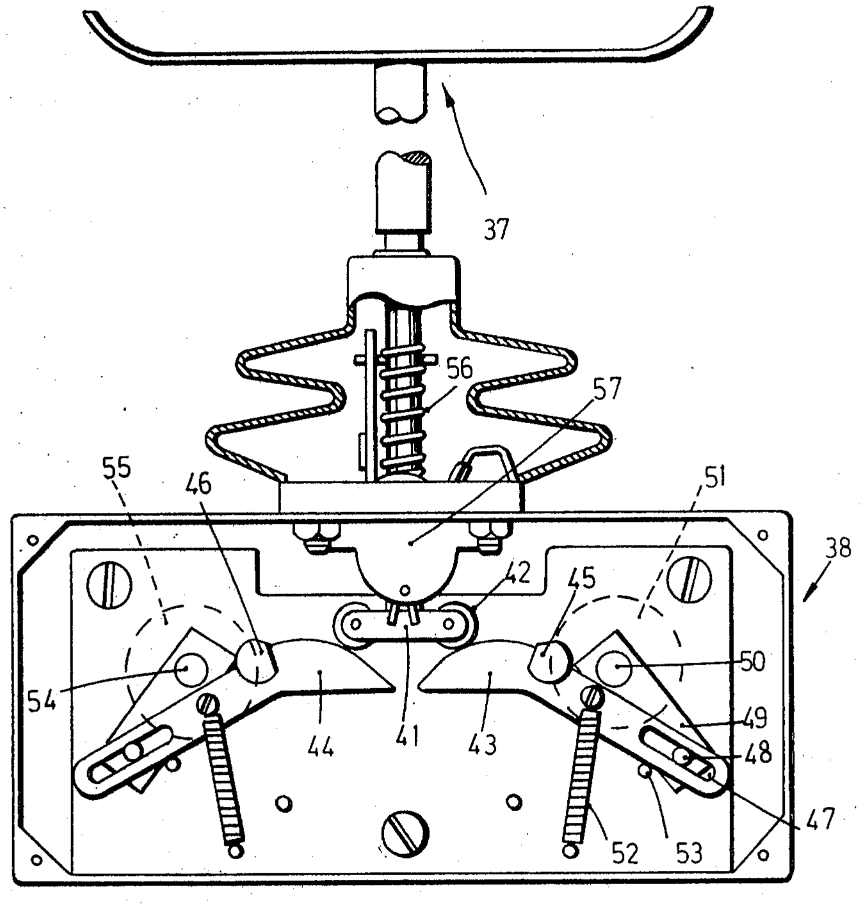
FIG. 2 is a perspective view of one embodiment of control unit.

In order to control the operation of the wheelchair there is provided a chin control lever 37 connected to a control unit 38 which is supported by a bracket 39 on the wheelchair by an L-shaped tubular member 40. Referring now in addition to FIG. 2 a section through the control unit 38 is shown with part of the chin control lever 37.

If the "chin control" lever is to be operated by an arm, leg, or neck of a person it will of course be placed in a different position.

The control lever 37 passes through an aperture into the control unit 38. At its lower end it has a transverse member 41 each end of the transverse member 41 carrying a wheel 42. The wheels of the transverse member 41 engages the surface of two cam members 43 and 44, the cam members 43 and 44 are mounted for rotational movement about the spigots 45 and 46 respectively. One end of the cam member 43 is provided with a slot 47 in which a pin 48 is engaged, the pin 48 being mounted on one end of a lever 49. The other end of the lever 49 is connected to the spindle 50 of a variable resistor shown in broken lines at 51.

A spring 52 biases the cam 43 into the position shown in FIG. 2 such that the cam abuts a peg 53 secured to the control unit chassis.

The cam 44 is connected in an identical manner to the spindle 54 of a variable resistor 55 shown in broken lines.

The chin control lever 37 is biased by a coil spring 56 so that in order to depress the lever 37 in a downwards direction the spring 56 has to be compressed.

The control lever 37 is not only capable of movement in a vertical direction but also limited pivotal movement about a pivotal axis 57. Spring 58 maintains the control lever 37 in an upright "at rest" position.

The operation of the chin control lever 37 will now be described.

As the control lever 37 is depressed thus compressing the spring 56 the cam 43 is caused to rotate about its axis 45 in an anti-clockwise direction, thus causing similar rotation of the spindle 50 of the variable resistor 51. Likewise the spindle 54 of variable resistor 55 will be rotated by exactly the same amount.

If, for example, while the lever 37 is depressed by half the amount possible and is then pivoted to the left so that it takes up a position, while still being depressed, of about 15° to the vertical, in view of the shapes of the cams 43 and 44 the spindle 50 of the variable resistor 51 will be further rotated as if the control lever 37 was being depressed further. However, the spindle 54 of the variable resistor 55, under the action of the returning spring, will rotate in a direction towards its "at rest" position or at least rotate a small amount in that direction. Thus it will be appreciated that the wiper arms connected to the spindles 50 and 54 of the variable resistors 51 and 55 respectively are not in the same position relative to each other. Thus the resistance of one of the variable resistors, in this case the variable resistor 55, will be greater than the resistance of the variable resistor 51. (Resistance of the variable resistors 51 and 55 decreases on rotation from their "at rest" position).

From the description given above it can be deduced that if the control lever 37 is pivoted to the right and depressed the wiper arm connected to the spindle 54 of the variable resistor 55 will be rotated through a much greater angle than the wiper arm on the spindle 50 of the variable resistor 51.

Figure 3:
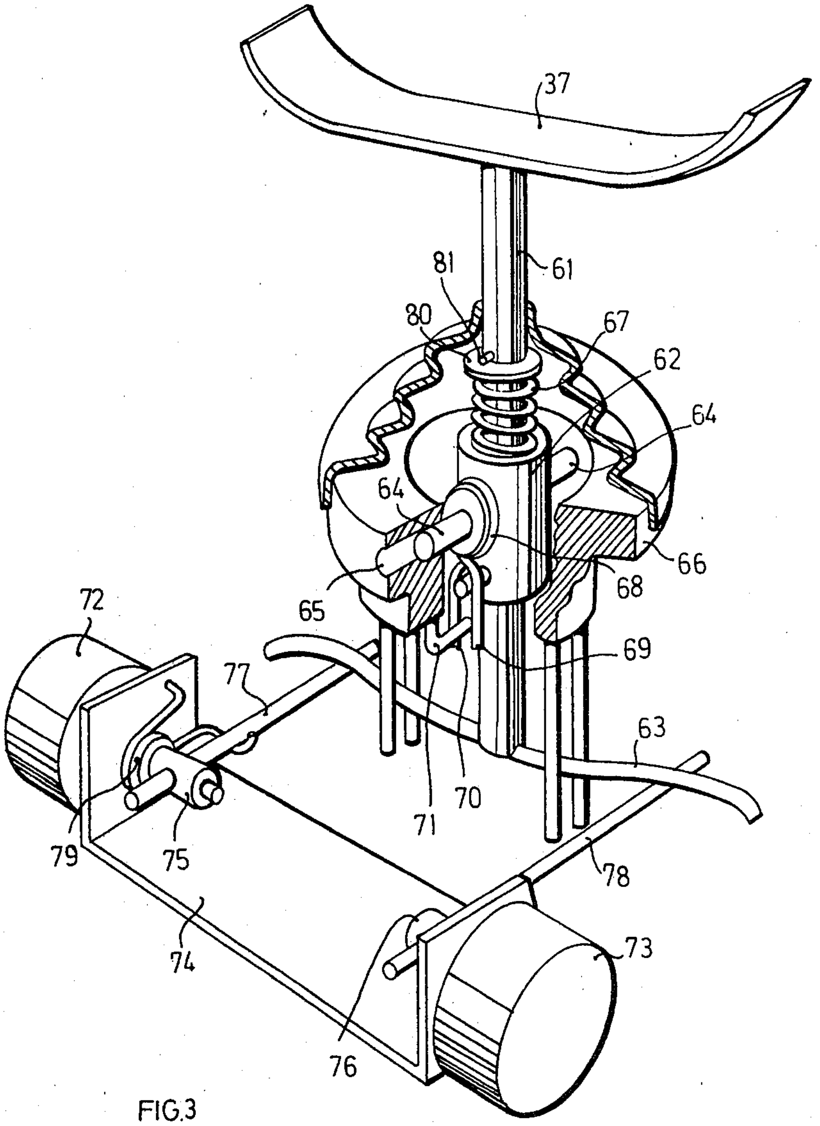
FIG. 3 is a perspective view of a second embodiment of the control unit.

Referring now to FIG. 3 an alternative form of control unit is illustrated such unit comprising the chin engageable part 37 secured to a rod 61. The rod 61 passes through a boss 62 and is secured to the other end thereof a transverse rod member 63.

A pair of dowels 64 which have one end secured into a through bore 65 provided in a ring member 66. The dowels 64 may either be a push fit in the through bore 65 in order that they should be secured thereto or, alternatively or additionally may each also be provided with a grub screw to provide positive location. The other ends of the dowels 64 are located in diametrically opposed sockets in the boss 62. The dowels 64 are provided with a clearance fit in the sockets and boss 62 thus enabling the rod 61, together with the boss 62, to pivot about the longitudinal axis of the dowels 64.

A helical spring 67 resiliently biases the rod 61 in an upwards direction. Movement in an upwards direction may be limited by a pin passing through the rod 61 coming into contact with the lower edge of the boss 62. Alternatively the ring 66 and/or the boss 62 may be of a configuration such that the transverse rod member 63 abuts the lower edge of either the boss 62 or the ring member 66 thus providing a limit to movement in an upwards direction of the rod 61.

Movement in a downwards direction is limited when the spring 67 is fully compressed, the upper end of the spring 67 being captivated by washers 80 and a pin 81 passing diametrically through the rod 61.

The amount of pivotal movement is limited by the physical dimensions of the ring 66 and the boss 62. A spring 68 having elongated ends 69 and 70 is positioned between the boss 62 and the ring part 66 is located on the dowel 64. Intermediate the elongate ends 69 and 70 is positioned a projecting bar 71 which is secured to the ring part 66. The effect of the spring 68 is resiliently bias the chin engageable unit comprising the chin engageable part 60 and the rod part 61 in a substantially vertical position such that the amount of pivotal movement permissable about the axis of the dowel 64 is equal on each side.

Two variable resistors 72 and 73 are mounted on a U-shaped bracket 74. The spindles 75 and 76 respectively of the variable resistors 72 and 73 each have a diametric through bore therethrough in which is located rod members 77 and 78 respectively. Each spindle is provided with a helical spring, only one of which is shown at 79, which resiliently biases the spindle in an anti-clockwise direction. Rotational movement of the spindle is prevented in an anti-clockwise direction by the rods 77 coming into abutment with the transverse rod member 63.

The operation of this embodiment of the control unit will now be described.

As the chin engageable part 37 is depressed hence depressing the spring 67, the member 63 moves in a downwards direction and since the rod members 77 and 78 are kept in constant abutment with the member 63 under the action of the springs, one of which is 79, both spindles 75 and 76 of the variable resistor 72 and 73 respectively will be rotated relative to the body part of the variable resistor. Since the variable contact of the variable resistor is carried by the spindle, a change in resistance will take place between an end of the carbon track and the variable contact.

If, for example, the chin engageable part 37 is depressed by half the maximum amount possible and is then pivoted to the left so that it then takes up a position, while still being depressed over about 15° to the vertical, in view of the shape of the member 63 the spindle 75 of the variable resistor 72 will be further rotated as if the chin engageable part 37 had been depressed further. However, the spindle 76 and the variable resistor 73 under the reaction of the returning spring (not shown), will rotate in a direction towards its "at rest" position or at least rotate a small amount in that direction. Thus, it will be appreciated that the variable contacts connected to the spindles 75 and 76 of the variable resistors 72 and 73 respectively are not in the same position relative to each other. Thus the resistance of one of the variable resistors in this case the variable resistor 73, will be greater than the resistance of the variable resistor 72.

From the description given above it can be deduced that if the chin engageable part 37 is pivoted to the right and depressed the variable contact of the spindle 76 of the variable resistor 73 will be rotated through a greater angle than the variable contact of the spindle 75 of the variable resistor 72.

It should be pointed out that full movement either to the left or to the right of the chin engageable part 60 without the application of any force in a downwards direction will in fact cause rotation of the spindle 75 of the variable resistor 72 or the spindle 76 of the variable resistor 73 respectively and cause the wheelchair to steer to the left or to the right respectively, any downwards force applied to the chin engageable part 37 in a downwards direction merely acting to increase the speed in the direction in which the wheelchair is being steered.

Figure 4:
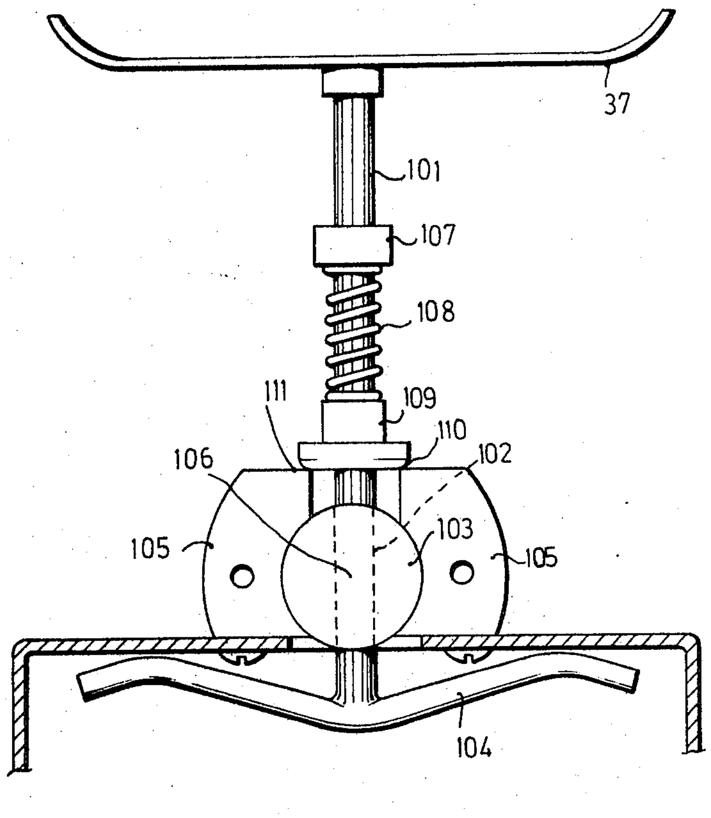
FIG. 4 is a perspective view of an alternative construction of part of the embodiment shown in FIG. 3.

Referring now to FIG. 4, the unit comprises a chin engageable part 37 secured to a rod 101. The rod 101 passes through a through bore 102 in a disc member 103 and has secured at its other end a transverse rod member 104 similar in shape to the transverse rod member 63 shown in FIG. 3.

The disc member 103 is mounted between two blocks 105 and is capable of rotational movement relative thereto about an axis 106.

The through bore 102 through the disc 103 is of a diameter such that the rod 101 is capable of sliding movement relative to the disc member 103.

A bush 107 is secured to the rod member 101 on a grub screw for example the underside of the bush 107 having a seating against which the upper end of the helical spring 108 is seated. The other end of the helical spring 108 abuts a centering member 109. The underside of the centering member 109 has a bevelled edge 110 such that it acts on the corners 111 of the block members 105 to centralise the rod member 101 relative to the block members 105.

The part of the control unit illustrated in FIG. 4 acts in a similar manner to the control unit shown in FIG. 3 nd it will be appreciated that the rod member 101 may be moved in a downwards position on application of a force to the chin engageable part 37 such downward force compressing the helical spring 108. The rod member 101 may also be moved either to the left or to the right which movement will cause angular movement of the disc member 103 relative to the blocks 105.

Figure 5:
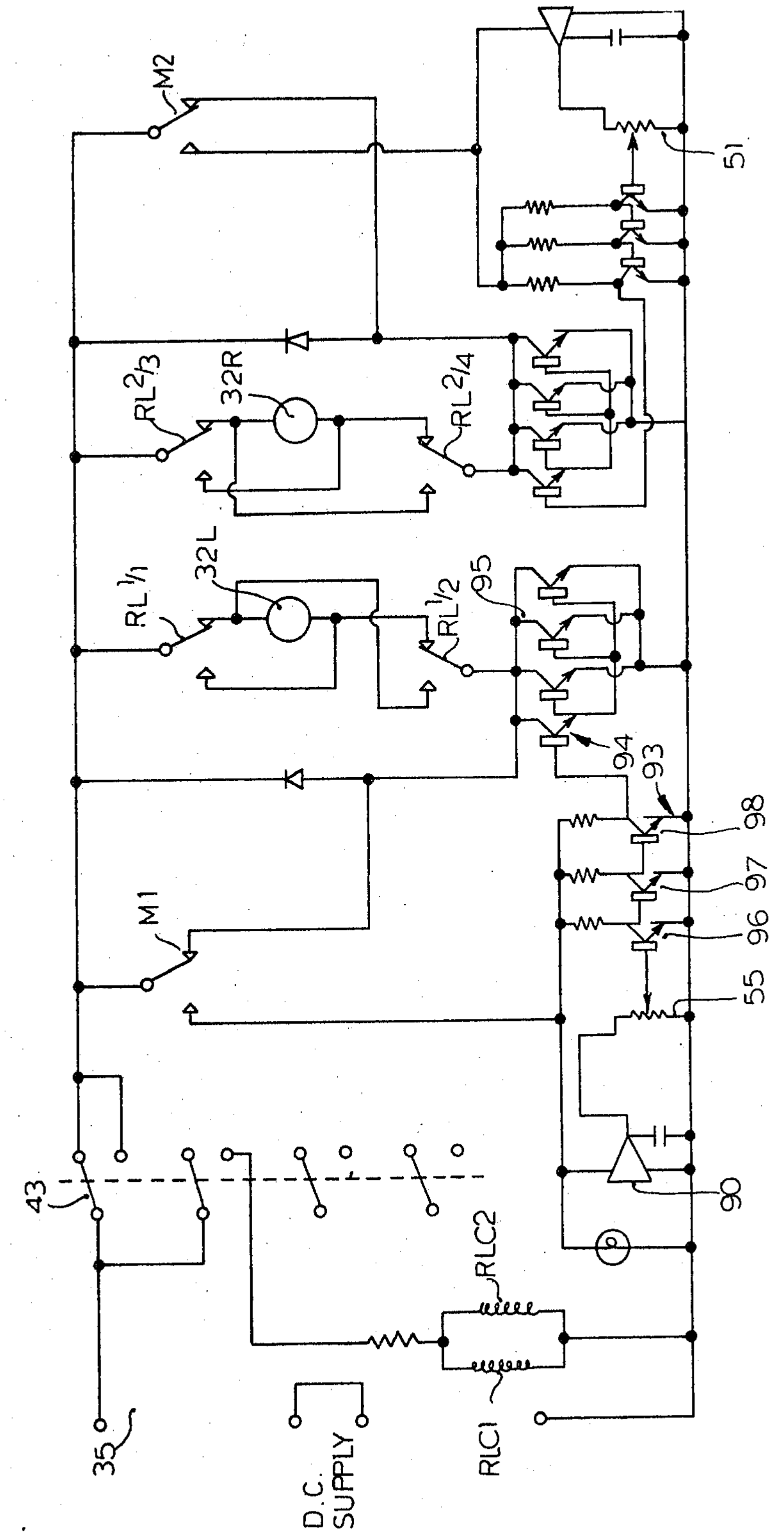
FIG. 5 is a circuit diagram of an electronic control circuit for use in conjunction with the control unit.

Considering now FIG. 5 the control circuit for driving the electric motor 32 will now be described with reference in particular to the control unit shown in FIG. 2. It will be appreciated, however, that since the control unit shown in FIG. 3 together with the modification thereof shown in FIG. 4 operate the variable resistors in an identical manner to that shown in FIG. 2 further description of the control circuit with reference to the embodiment shown in FIG. 3 and the modification thereof shown in FIG. 4 is not necessary.

Each motor 32*r*, 32*l* is driven by the batteries contained within the battery box 35, the power being transmitted to the motors being controlled by an electronic control circuit each circuit comprising an integrated circuit 90, variable resistor 92*l* of the left hand motor, transistor switching shaping circuit 93 comprising transistor 96, 97, 98, a switching transistor 94 and three further switching transistors 95.

The control circuit used with the control unit is a mark space ratio chopper circuit one circuit for each motor.

One of the control circuits, the two circuits for each motor being identical, will now be described.

An integrated circuit 90 when connected across the power supply generates a triangular wave form which is connected across the variable resistor 55.

The wiper arm connected to the spindle 54 is only moved when the chin control lever 37 is depressed. The value of the resistor 55 is chosen such that when the wiper arm of the resistor is at the point where the control unit 38 is at its "at rest" position, the potential on the wiper arm is such that the first transistor of the transistor switching and shaping circuit 93 will not conduct. As soon as the wiper arm is moved and the resistance decreases the first transistor will then periodically conduct. The reason for this periodical conduction is that since the wave form across the resistor 55 is of triangular configuration the voltage on the wiper arm of the variable resistor 55 will only be high enough to forward bias the base emitter junction of the transistor 96 at the apex of each triangle of the triangular wave form.

As the wiper arm is rotated around the variable resistor 55 from its "at rest" position the period for which the first transistor of the transistor switching and shaping circuit 93 will conduct increases. Since the potential at which conduction takes place is a constant value and the D.C. potential of the wiper arm increases as the rotation of the wiper arm from its "at rest" position increases the period of conduction of the transistor switch and shaping circuit will increase until the wiper arm has reached the point of highest potential and the transistor 96 will then be conducting virtually continuously.

When the transistor 96 conducts, the second transistor 97 will then be switched off since the potential across the base emitter junction will fall. When the transistor 97 switches off the third transistor 98 will switch on due to the forward bias base emitter junction. The output of the transistor switching shaping circuit 93 will be a pulsed wave form having fairly sharp corners. The duration of each pulse being dependent on the position of the wiper arm of the variable resistor 55. The transistor 94 will switch on when a pulse is given by the circuit 93 and the switching on of the transistor 94 will cause all transistors in the circuit 95 to switch on simultaneously and thus pulses of power will be supplied to the motor 32*l*.

Since the width of the pulses with respect to time, at the conduction level of transistor 96, can be varied depending on the position of the wiper arm of the variable resistor 55 the speed of the motor will also be varied the speed being dependent on the power supplied, i.e. the pulse width.

If it is required to steer the wheelchair in a straight ahead position the chin control lever 37 is depressed in a vertical direction and both wiper arms of the variable resistors 51 and 55 are moved through the same angle, therefore exactly the same power will be delivered to each of the motors 32. Furthermore it will be appreciated that the speed control between the lowest and the maximum speed of the wheelchair is infinitely variable.

When it is required to steer the wheelchair either to the left or to the right the chin control lever 37 if, for example, the occupant wishes the wheelchair to turn to the left is pivoted slightly to the left. This has the effect of increasing the rotation of the wiper arm of the variable resistor 51 and decreasing the rotation of the wiper arm of variable resistor 55 from their "at rest" positions. Thus the power supplied to the right hand motor will increase while the power supplied to the left hand motor will decrease, the wheelchair will then turn to the left.

The cams 43 and 44 are shaped so that if the chin control lever 37 is moved only slightly to the left the differential in power supplied to the two motors is very small and therefore the radius of the angle of turn will be very large. The rod members 63, 104 are shaped to provide a similar effect. If, however, it is required to turn through a sharp corner the chin control lever is moved through a position of full lock and the power differential then supplied to the motors is large, thus the right hand motor will turn considerably faster than the left hand motor so that the radius of the angle of turn will be small. Thus the radius of the angle of turn which the wheelchair can make is infinitely variable between a straight ahead position and the condition where one motor is stopped and the other motor is rotating relatively fast. It will also be appreciated that while the wheelchair is being turned through an angle the forward speed of the wheelchair is still variably controllable and dependent on the depression in a downwards direction of the chin control lever 37.

A further control illustrated at 36 may be provided secured to the back of the wheelchair, the control unit being provided with a switch 33 which may either directly itself or via relays or an electronic switching circuit, switch on the power to the control circuit shown in FIG. 3.

A further switch 34 may be a two position switch controlling relay coils RLC1 RLC2 having contacts RL1/1-2 RL2/1-2. In one position of the switch the relay contacts will be in the position shown in FIG. 3 and in the other position of the switch they will move to the other position, thus reversing the polarity of the power supplied to the motor 32 and thus operation of the control lever 37 will cause the wheelchair to drive in a reverse direction. In conjunction with the further control unit 36 lights may be provided on the control unit 38 such as a light which is illuminated when the switch 33 has been operated to connect the control circuit to the batteries and another light which illuminates when the reverse switch 34 has been operated.

The circuit may also include two microswitches M1 and M2. When the wheelchair is "at rest" the microswitches are operative to short circuit the motors to provide a breaking effect. As soon as the chin engageable part 37 is moved the microswitchs M1 and M2 will open to allow the circuit to operate.

It can thus be seen that the wheelchair may be simply operated by a person not having the use of his hands.

If required the wheelchair may be provided with handles 58 only one of which is visible in FIG. 1 and a further control box 59 may be secured on the handle 58 or adjacent thereto. The control box 59 can be provided with a switch whereby the control unit 38 and further control unit 36 can be isolated and the movement of the wheelchair controlled from the control box 59 by a person walking behind the wheelchair. The control box 59 may contain a control circuit similar to that shown in FIG. 3 or may be of a more basic nature incorporating direct switching of the battery to one of or both motors.

All the wires leading out of each of the control units are provided with a plug and each is adapted to fit into a corresponding socket such that all the control units can be moved with considerable ease and the chair may then be folded, after operation of the overcentre links so that the two frames 10 and 11 abut one another.

We claim:

1. In a wheelchair having, a power source, a driving wheel on each side of the wheelchair, and at least two motors one motor driving a wheel on one side of the wheelchair and the other motor driving a wheel on the other side of the wheelchair, the improvement comprising:

1. a control unit including first and second power control means respectively for controlling the supply of power from the power source, to said one and said other of said motors, and each having an operating member movable from an "at rest" position towards an operated position to increase the power supplied to the respectively controlled motor,
2. an operating means for said first and second control means including:
   a. a chin-engageable part,
   b. mounting means for mounting the chin-engageable part on said control unit for movement relative thereto in first, second and third directions from an "at rest" position,
   c. biasing means adapted to bias the chin-engageable part into its "at rest" position, and
   d. means connecting the chin-engageable part to said operating members of said first and second power control means for transmitting movement thereto in response to movement of said chin-engageable part in said first, second, and third directions respectively to:
      i. move both of said operating members from their "at rest" positions towards their operated positions,
      ii. move said operating member of said first power control means from its "at rest" position towards its operated position to an extent greater than any corresponding movement applied to said operating member of said second power control means, and
      iii. move said operating member of said second power control means from its "at rest" position towards its operated position to an extent greater than any corresponding movement applied to said operating member of said first power control means, and
3. a support member for supporting said control unit in a position with said chin-engageable part in proximity to the chin of an occupant of the wheelchair.

2. The improvement claimed in claim 1 wherein the means connecting the chin-engageable part to said operating member provides progressively increased displacement of said operating members from said "at rest" positions respectively in response to increased displacement of the chin-engageable part in the second or third direction respectively whereby to increase the differential in the power supplied to the motors.

3. The improvement claimed in claim 2 wherein said mounting means includes means permitting of movement of said chin-engageable part in said first direction simultaneously with movement of said chin-engageable part in said second or said third direction.

4. The improvement claimed in claim 3 wherein said means permitting of movement in said first direction constrains said movement to a downward direction relative to said control unit and wherein said mounting means includes pivot means constraining said chin-engageable part to pivotal movement from said "at rest" position clockwise to define said second direction and anti-clockwise to define said third direction.

5. The improvement claimed in claim 4 wherein:

a. each of the power control means comprises a variable resistor, b. the operating means is connected to said operating members of said power control means to vary the position of respective variable contacts on each of said resistors, c. the control unit includes an electronic circuit comprising a mark space ratio chopper circuit, movement of the variable contacts of the variable resistors being operative to vary the mark space ratio and hence the power supplied from the power source through the electronic circuit to the motors connected respectively to said variable resistors, d. said biasing means comprise resilient means to bias the chin-engageable part to its "at rest" position, e. a further control unit is provided, said further control unit including a power isolating switch for disconnecting the power source from said electronic circuit, and further comprises a forward/reverse switch settable in respective forward and reverse positions which establish drive of the wheelchair in a forward and reverse mode respectively in response to movement of the chin-engageable part from its "at rest" position.

* * * * *